US010627782B2

(12) United States Patent
Oda et al.

(10) Patent No.: US 10,627,782 B2
(45) Date of Patent: Apr. 21, 2020

(54) GLOBAL TIME SERVER FOR HIGH ACCURACY MUSICAL TEMPO AND EVENT SYNCHRONIZATION

(71) Applicant: The Trustees of Princeton University, Princeton, NJ (US)

(72) Inventors: Reid Oda, Culver City, CA (US); Rebecca Fiebrink, London (GB)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 25 days.

(21) Appl. No.: 15/864,314

(22) Filed: Jan. 8, 2018

(65) Prior Publication Data
US 2018/0196393 A1    Jul. 12, 2018

Related U.S. Application Data

(60) Provisional application No. 62/443,050, filed on Jan. 6, 2017.

(51) Int. Cl.
*G10H 1/00* (2006.01)
*G10H 1/40* (2006.01)
(Continued)

(52) U.S. Cl.
CPC .............. *G04F 5/025* (2013.01); *G06F 17/11* (2013.01); *G10H 1/00* (2013.01); *G10H 1/0058* (2013.01);
(Continued)

(58) Field of Classification Search
CPC .............. G10H 1/40; G10H 2240/325; G10H 2210/391; G10H 2220/081;
(Continued)

(56) References Cited

U.S. PATENT DOCUMENTS 7,582,822 B1 * 9/2009 Olander-Waters ...... G04F 5/025
84/484
9,693,137 B1 * 6/2017 Qureshi ................. H04R 3/005
(Continued)

FOREIGN PATENT DOCUMENTS

CN        2684241 Y        3/2005

OTHER PUBLICATIONS

Ableton link. https://www.ableton.com/en/link/. Accessed: Jan. 1, 2016.
(Continued)

*Primary Examiner* — Marlon T Fletcher
(74) *Attorney, Agent, or Firm* — Meagher Emanuel Laks Goldberg & Liao, LLP

(57) ABSTRACT

Systems, methods and apparatus directed to a global metronome configured at each of one or more locations to receive a high accuracy timing signal and responsively update a local clock thereto, to determine a phase of a virtual metronome using the updated local clock, a predetermined epoch start time and a predetermined virtual metronome period, to phase synchronize a local metronome to the virtual metronome, and to control local devices providing audio playback and/or a sequence of nonmusical events in accordance with start/stop/tempo messages configured in accordance with the local metronome. By using the global metronome at each of a plurality of locations to synchronize/control devices at those locations, the local devices that each of the plurality of locations are inherently synchronized with each other.

20 Claims, 3 Drawing Sheets

(51) Int. Cl.
*G04F 5/02* (2006.01)
*G06F 17/11* (2006.01)
*H04L 7/08* (2006.01)
*H04J 3/06* (2006.01)
*H04L 29/06* (2006.01)

(52) U.S. Cl.
CPC .............. *H04J 3/0632* (2013.01); *H04L 7/08* (2013.01); *H04L 65/60* (2013.01); *H04L 65/80* (2013.01); *H04L 69/28* (2013.01); *G10H 2210/391* (2013.01); *G10H 2240/175* (2013.01); *G10H 2240/205* (2013.01); *G10H 2240/325* (2013.01)

(58) Field of Classification Search
CPC ....... G10H 2210/076; G10H 2210/341; G10H 2220/086; G10H 2210/381; G10H 2210/071; G10G 1/00
See application file for complete search history.

(56) References Cited

U.S. PATENT DOCUMENTS

| | | | | |
|---|---|---|---|---|
| 2009/0153350 | A1* | 6/2009 | Steger | A63B 71/0686 340/4.2 |
| 2011/0023691 | A1* | 2/2011 | Iwase | G10H 1/0066 84/612 |
| 2013/0025437 | A1* | 1/2013 | Serletic | G10H 1/0025 84/634 |
| 2014/0223221 | A1* | 8/2014 | Verbeure | G06F 1/08 713/503 |
| 2014/0228649 | A1* | 8/2014 | Rayner | A61B 5/1118 600/301 |
| 2014/0337647 | A1* | 11/2014 | Jiang | G06F 1/324 713/322 |
| 2017/0221463 | A1* | 8/2017 | Lenhert | G10H 1/0025 |
| 2018/0196393 | A1* | 7/2018 | Oda | G10H 1/00 |

OTHER PUBLICATIONS

C. Bartlette and M. Bocko. "Effect of Network Latency on Interactive Musical Performance." Music Perception, 24, 2006.

Caceres and C. Chafe. "JackTrip: Under the hood of an engine for network audio.", Journal of New Music Research, 2010.

C. Chafe, J. Caceres, and M. Gurevich. "Effect of temporal separation on synchronization in rhythmic performance.", Perception, 39, 2010.

C. Chafe, M. Gurevich, G. Leslie, and S. Tyan. "Effect of time delay on ensemble accuracy.", In Proc. the International Symposium on Musical Acoustics, 2004.

E. Chew, A. Sawchuk, C. Tanoue, and R. Zimmermann. "Segmental tempo analysis of performances in user-centered experiments in the distributed immersive performance project.", In Proc. Sound and Music Computing Conference, 2005.

J. Elson, L. Girod, and D. Estrin. "Fine-grained network time synchronization using reference broadcasts.", ACM SIGOPS Operating Systems Review, 36, 2002.

D. L. Mills. "Internet time synchronization: The network time protocol." Communications, IEEE Transactions on, 39, 1991.

R. A. Moog. "Midi: Musical instrument digital interface." Journal of the Audio Engineering Society, 1986.

S. B. Moon, P. Skelly, and D. Towsley. "Estimation and removal of clock skew from network delay measurements." In Eighteenth Annual Joint Conference of the IEEE Computer and Communications Societies, 1999.

J. Narveson and D. Trueman. "Landini: a networking utility for wireless lan-based laptop ensembles." In Proc. SMC Sound, Music and Computing Conference, 2013.

S. Sesia, I. Toufik, and M. Baker. "LTE: the UMTS long term evolution." Wiley Online Library, 2009.

Oda et al.: "The Global Metronome: Absolute Tempo Sync for Networked Musical Performance" NIME'16, Griffith University, Brisbane, Australia, Jul. 11-15, 2016.

* cited by examiner

GLOBAL TIME SERVER FOR HIGH ACCURACY MUSICAL TEMPO AND EVENT SYNCHRONIZATION

CROSS-REFERENCE TO RELATED APPLICATION

This application claims the benefit of provisional patent application Ser. No. 62/443,050 filed on Jan. 6, 2017, entitled GPS CONNECTED TIME SERVER FOR HIGH-ACCURACY MUSICAL TEMPO SYNCHRONIZATION, which provisional patent application is incorporated herein by reference in its entirety.

FIELD OF THE INVENTION

The invention relates to the field of timing synchronization and, more particularly but not exclusively, to timing synchronizing of musical performances or other events at one or more locations.

BACKGROUND

Much of popular music is performed with rhythmic synchronization between musicians. Performing this style of music with musicians remote from each other, such as via an Internet connection and the like, is difficult due to network latency and other Quality of Service (QoS) issues. For example, network packets containing encoded audio take time to travel from a sender (playing musician) to a receiver (listening musician), resulting in a delay between when a note is played by the playing musician and when it is heard by the listening musician. Further, a listening musician instinctively waits to play in order to play in time with the music she hears from the playing musician, which causes further delay. This, in turn, causes a cascade effect denoted as a tempo drag where players on each side of a connection wait longer and longer. If there is too much latency, timing falls apart.

There is currently no device for synchronizing tempo or audio over long distances. The current approach is to have devices negotiate sync over a network. This has a number of well-studied problems, the biggest of which is that while it is impossible to estimate network congestion in each direction, all common network clock synchronization approaches nevertheless assume that congestion is the same in both directions.

SUMMARY

The present invention is directed to a global metronome apparatus configured to receive a high accuracy timing signal and responsively update a local clock thereto, to determine a phase of a virtual metronome using the updated local clock, a predetermined epoch start time and a predetermined virtual metronome period, to phase synchronize a local metronome to the virtual metronome, and to control local devices providing audio playback and/or a sequence of nonmusical events in accordance with start/stop/tempo messages configured in accordance with the local metronome. By using the global metronome at each of a plurality of locations to synchronize/control devices at those locations, the local devices that each of the plurality of locations are inherently synchronized with each other.

An apparatus according to one embodiment includes a timing reference receiver, for receiving a high accuracy timing signal configured to synchronize a local clock; a metronome synchronizer, cooperating with the local clock, for synchronizing a phase of a local metronome to a phase of a virtual metronome to provide thereby a sequence of phase synchronized metronome output beats, the virtual metronome phase determined using an epoch-specific time t and a metronome period T; and a local interface, to communicate start, stop and tempo messages toward one or more local audio devices in accordance with the phase synchronized metronome output beats. The apparatus may also include a local computing device, coupled to the one or more local audio devices for receiving audio data therefrom, and configured to transmit the audio data to a remote computing device using a network audio protocol (NAP).

A method according to one embodiment for synchronizing respective local metronomes at each of a plurality of locations is performed by a respective electronic device at each of the plurality of locations, the method comprising: receiving a high accuracy timing signal and using the high accuracy timing signal to update a local clock; determining a phase of a virtual metronome using the updated local clock, a predetermined epoch start time and a predetermined virtual metronome; synchronizing a phase of a local metronome to the determined phase of the virtual metronome; and generating control messages associated with local devices in accordance with the local metronome.

A system according to one embodiment comprises an apparatus at a first location communicating with an apparatus at a second location via a network audio protocol (NAP), wherein each apparatus comprises a local clock; a timing reference receiver, for receiving a high accuracy timing signal and synchronizing the local clock in accordance with the received high accuracy timing signal; and a metronome synchronizer, for synchronizing a phase of a local metronome to a calculated phase of a master metronome; and wherein the apparatus at the first location further comprises a tempo controller, for generating tempo control information configured to cause a local device to start playing an audio program at a defined tempo; and a computing device, for transmitting an audio stream including the audio program via the NAP; and wherein the apparatus at the second location further comprises an audio input device, for receiving a live performance audio signal; a computing device, for receiving the audio stream including the audio program via the NAP; and an audio presentation device for presenting the audio program and the life performance.

BRIEF DESCRIPTION OF THE DRAWING

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
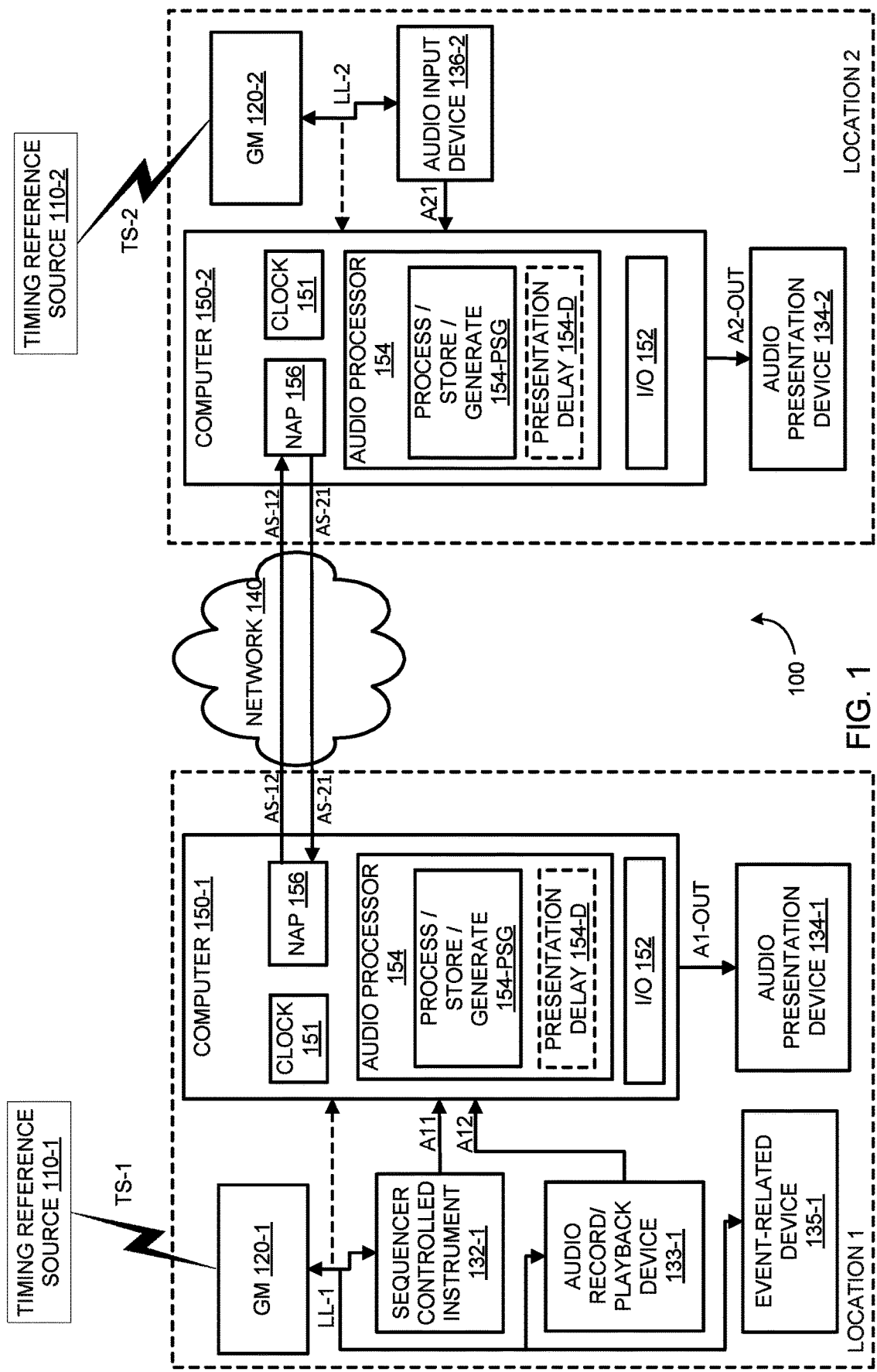
FIG. 1 depicts an exemplary system of global metronomes in accordance with various embodiments.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It must be noted that as used herein and in the appended claims, the singular forms "a", "an", and "the" include plural referents unless the context clearly dictates otherwise.

Various embodiments provide a mechanism for synchronizing events via a communications network such as the Internet. Events to be synchronized may comprise musical events such as performances by multiple musicians located at various locations. Events to be synchronized may comprise non-musical event such as audio or audiovisual presentations associated with amusement park rides, light shows, fireworks displays or any other media application where events must be tightly coordinated. Thus, while primarily discussed within the context of musical performances, the various embodiments are applicable to a broad range of remote synchronization applications, which remote synchronization applications are contemplated by the inventors. Further, while primarily discussed within the context of synchronizing events at different locations, various embodiments also enable wireless tempo synchronization, event synchronization and the like between devices at the same location.

Various embodiments enable accurate synchronizing of musical tempos over a communications network by providing respective synchronized local "metronomes" to musical performers at each of a plurality of locations, thereby gaining rock-solid musical timing despite audio delays between the musical performers.

Generally speaking, various embodiments of the global metronome contemplate synchronizing devices that are not connected to each other. Such devices may be at the same location or different locations. Examples of use cases include: synchronizing the tempo of rhythmic devices within the same room without running cables between the devices; synchronizing the tempo of devices that are miles away from each other, but can still be seen or heard from a single location; synchronizing devices over a network connection. Another use case comprises people using their mobile devices to create music collaboratively or to play music together.

The various embodiments allow a number of people who are using sequenced instruments (drum machines, keyboard/synthesizer, digital audio workstation software, stand-alone sequencers and the like) to play together over the web. The GM allows them to start and stop their devices in a way that is aligned to the beat and the measure. For example, if a traditional musician (singer, guitarist) also wants to play along with the sequenced instruments, then the perceived latency of that musician must be low enough so he or she can play "in time" with the others. The GM in this example may be configured to force the sequencer controlled instruments to play earlier. This means that there will be more of a delay between user input/actions applied to the sequencers (e.g., button presses, knob turns, data transfer/triggers) and the corresponding audio that is provided by the sequencers. The traditional musician will hear a shorter delay (30 ms is probably the maximum desired delay, though longer or shorter delays may be appropriate) which will allow them to enjoy playing.

By way of terminology, a clock's offset is "the difference between the time reported by the clock and the "true" such as defined by UTC. A clock's skew at a particular moment is the frequency difference (first derivative of its offset with respect to true time) between the clock and true time. Clock skew is not constant, especially under changing temperature conditions such as those created by computer processor heat waste. Drift is the second derivative of the clock's offset with respect to true time.

There are three aspects of clock synchronization that can also be generalized to tempo synchronization; namely, (1) frequency synchronization, which is getting clocks to run at the same rate; (2) phase synchronization, which is getting frequency synchronized clocks to "tick" in unison; and (3) time synchronization which is all of the clocks agree on the same time of day. Tempo synchronization is related to clock synchronization in that music and clocks can be conceptualized as an oscillator and a counter that counts the oscillations. Whereas a clock might count seconds (or in most cases, small fractions of a second), in music it is beats that are counted. The musical equivalent of frequency synchronization is synchronizing tempo beats per minute. The equivalent of phase synchronization is note or measure phase, (i.e., getting tempo-synchronized scores to start playing notes or measures at the same time). The tempo synchronization equivalent of time synchronization is to agree on the position within a score (i.e., the number of notes or measures that have been played so far).

From the perspective of the GM, time is divided into a beat grid. These beats can be divided into measures. The most common is 4 beats per measure. For a tempo of 120 bpm every GM can compute the start of the next beat and the start of the next measure. If latency between devices is symmetric and latency is to be shared equally, then the optimal time to hit "start" for a local and remote process is at the same time. If latency is larger in one direction then it may be optimal to start one before the other.

Computing devices, such as those described below, generate audio and music by scheduling events according to an internal clock. Such events may be musical events as primarily discussed herein. Such events may be non-musical event such as video events, pyrotechnics and so on which may be associated with a multimedia presentation, live performance and the like.

Starting, stopping and setting tempo are common approaches for humans to describe and attain rhythmic mechanization. The time at which events occur are how computers create music. The Global Metronome acts as a bridge between these two ways of thinking.

Tempo Changes. The GM provides an absolute reference "grid" around which tempo changes can occur. It allows all participants to know exactly which measure, beat, and fraction of a beat they should be currently playing. If artists are playing together and a series of tempo changes occur, if they are using common synchronization techniques such as MIDI clock or timecode drift can occur, especially over the Internet. The GM can allow each artist (or computer process) to know exactly where they should be at a given time. If the tempo changes are pre-planned then each process can look up where they should be. If it is not pre-planned and one is following the other then the first artist must transmit their tempo and phase to the other. This will cause a slight mismatch in synchronization, but in most cases this mismatch will be so slight that it will be inaudible.

FIG. 1 depicts an exemplary system of global metronomes in accordance with various embodiments. In particular, FIG. 1 depicts a system 100 configured to provide timing and tempo synchronization to devices at, illustratively, two locations. In particular, a first location (LOCATION 1) is depicted as including a sequencer controlled instrument 132 (e.g., a drum machine or sound synthesizer) and an audio playback device 133 (e.g., an audio stream server), while a second location (LOCATION 2) is depicted including an audio input device 136 (e.g., a microphone to record the voice of a singer). The exemplary system 100 of FIG. 1 will be described within the context of using a respective global metronome 120 at each location to synchronize timing and tempo information between the two locations such that the tempo of the sequencer controlled instrument 132 and audio playback device 133 at the first location is synchronized with a singer or musician at the second location. It will be appreciated that timing and tempo synchronization of devices at more than two locations may be provided in accordance with the various embodiments. This example, As depicted in FIG. 1, the first location includes a first global metronome (GM) 120-1 configured to receive and process a first timing signal TS-1 broadcast by a first timing reference source 110-1, and to communicate via a first local link (LL-1) timing and/or tempo synchronization information to several local devices; namely, sequencer controlled instrument 132-1, audio record/playback device 133-1, event-related device 135-1 and, optionally, a first computer 150-1. Devices of other types may also be deployed at one or more locations as described herein. Further, more or fewer devices of any individual type may be deployed. Further, functions described as being provided by a particular device may instead be provided by a computer 150 including hardware or a combination of hardware and software configured to perform the functions described with respect to the particular device.

The operation of an exemplary GM 120 will be described more detail below with respect to the various figures. General speaking, the first GM 120-1 sends messages to the sequencer controlled instrument 132-1 and audio playback device 133 via first local link LL-1, which messages cause the sequencer controlled instrument 132-1 and audio playback device 133 to start or stop playing their respective songs/audio programs, define the tempo to be used in playing the songs/audio programs, change or offset/delay that tempo, change or offset/delay responses to control information and so on.

The first local link LL-1 conveys timing and/or tempo synchronization information received from the GM 120-1 in accordance with a suitable message format.

The first local link LL-1 may comprise, illustratively, one or more of a computer interface such as a local area network (LAN), Musical Instrument Digital Interface (MIDI), analog audio output signal, digital audio output signal and/or other means suitable for communicating timing and or tempo synchronization information. The local link may convey time memorization information via Network Time Protocol (NTP), Precision Time Protocol (PTP), LANdini protocol, Ableton Link, MIDI clock and/or some other mechanism. The local link LL-1 may also comprise a wireless link utilizing any appropriate wireless interface means, such as Wi-Fi, WiMAX, Bluetooth and so on.

Timing synchronization information may comprise, illustratively, real time clock information, timestamp information, clock synchronization information (e.g., information suitable for use by the sequencer controlled instrument 132-1, audio playback device 133-1 or computer 150 to synchronize internal clocking circuitry), as well as other types of timing synchronization information such as discussed herein.

Tempo synchronization information may comprise any of a number of tempo-related messages such as for controlling a local device, such as a sequencer controlled instrument 132. Such tempo-related messages may comprise, illustratively, START (i.e., start audio program), STOP (i.e., stop audio program), TEMPO (i.e., define beats per second of audio program), OFFSET (i.e., define a temporal offset associated with user input to a sequencer controlled instrument, a phase offset or change to the beach or tempo, etc.) as well as other types of tempo synchronization information such as discussed herein.

Sequencer controlled instrument 132-1 generates an audio output signal A11 while audio record/playback device 133 generates an audio signal A12. More or fewer sequencer controlled instruments, audio record/playback devices, predictive instruments (not shown) and/or other audio generating devices may be used within the context of the various embodiments.

The sequencer controlled instrument 132-1 may comprise any type of sequencer controlled instrument such as a drum machine, keyboard synthesizer, digital audio workstation, stand-alone sequencer and the like. The sequencer controlled instrument 132-1 includes mechanical and/or electronic input mechanisms (not shown) for receiving control information defining the audio program to be generated. For example, a sequencer controlled instrument such as a drum machine or keyword synthesizer may be programmed via such input mechanisms to generate a particular song, with particular instruments, with a particular tempo etc.; other another audio programs may also be programmed/defined.

The audio recorded/playback device 133-1 may comprise any type of audio playback device (optionally audio playback and record device) such as an audio synthesizer, audio tape system, streaming audio source, computer implemented audio playback and/or record system and so on.

The event-related device 135-1 may comprise any type of device configured for controlling event information, such as timing/sequencing of video presentations, pyrotechnics, other audio sources and the like. The event-related device 135-1 may comprise a sequencer controlled device operative to perform certain functions at programmable or predefined times, perform such functions according to a programmable or predefined beat/tempo, and/or generally enable synchronization of non-audio events such as within the context of the synchronized functions described herein with respect to various embodiments.

The first computer 150-1 includes a clock 151, which may optionally be synchronized to the clock provided by first GM 120 1 via local link LL-1. The clock 151 may be used within the context of controlling start/stop times, tempo and the like for audio stored at, passing through or generated by the computer 150-1.

The first computer 150-1 includes input/output circuitry 152 for receiving audio signals A11 and/or A12 from any local audio signal generating devices (e.g., the sequencer controlled instruments 132-1 and audio record/playback device 133-1), and for providing at least one audio signal A1-out to an audio presentation device 130-1.

The first computer 150-1 includes a network audio protocol (NAP) module 156 which is used to implement a substantially fixed or constant latency transport mechanism between the first computer 150-1 at the first location and a second computer 150-2 at the second location.

The first computer 150-1 optionally includes an audio processor 154 which is used to process audio signals as appropriate, depending upon the use to which computer 150-1 is put at location.

Audio processor 154 may optionally implement hardware or combinations of hardware and software directed toward a process/store/generate 154-PSG; namely, processing audio signals to transform the audio information in some way, such as temporal or frequency processing, mixing and the like; transcoding the audio signals between different audio formats; encoding/decoding audio signals; transport encoding/decoding audio signals such as to prepare audio signals for subsequent communication via a network; storing/recording audio signals for subsequent use; generating audio signals such as by implementing within computer 150-1 a sequencer controlled instrument, audio record/playback device, predictive instrument and so on.

Audio processor 154 may optionally implement hardware or combinations of hardware and software directed toward a presentation 154-D; namely, processing audio signals intended for presentation by the audio presentation device 134 to selectively impart a delay to the audio signals such as to delay a locally generated audio signal (e.g., A11 or A12) by an amount of time equal to a latency associated with an audio signal received by the network 140 (e.g., A21) such that both local and remote audio signals are presented in a synchronous audio playback/presentation.

Generally speaking, the audio signals produced by sequencer controlled instrument 132-1, audio record/playback device 133-1 and any other local audio generating device are provided to the computer 150-1 where such audio signals are routed directly to the NAP 156 per transport as part of audio stream AS-12. These audio signals are also routed to the audio presentation device 134 for presentation, optionally after being processed via audio processor 154. Further, audio signals received via NAP 156 are routed to the audio presentation device 134 or presentation, optionally after being processed by audio processor 154.

The first computer 150-1 is configured to communicate audio signals A11, A12 and/or other audio signals to the second location by the network 140 as an audio stream AS-12 in accordance with the NAP. The first computer 150-1 is configured to receive an audio stream AS-21 from the second location via the network 140 in accordance with the NAP. The NAP may comprise Jack Trip or some other communications protocol directed to maintaining a substantially fixed latency communications channel(s).

Network 140 comprises, illustratively, an Internet Protocol (IP) network such as the Internet, an access network connected to the Internet (e.g., a mobile network or Internet of Things network), a corporate network or some other network supporting communications between the GM 120-1 and other devices may also be utilized within the context of various embodiments.

As depicted in FIG. 1, the second location includes a second global metronome (GM) 120-2 configured to receive and process a second timing signal TS-2 broadcast by a second timing reference source 110-2, and to communicate via a second local link (LL-2) timing and/or tempo synchronization information to several local devices; namely, audio input device 136-2 and, optionally, second computer 150-2.

The second local link LL-2 conveys timing and/or tempo synchronization information received from the second GM 120-2 in a manner similar to that described above with respect to the first local link LL-1.

The audio input device 136-2 may comprise a microphone or other audio input device for receiving any audio signal such as the sound generated by one or more singers, one or more instruments or any other audio signal. Audio input device 136-2 is depicted as generating an audio output signal A21 which is coupled to the second computer 150-2.

The second computer 150-2 includes a clock 151, input output circuitry 152, NAP 156 and optional audio processor 154, each of which works in substantially the same manner as described above with respect to first computer 150-1.

The second computer 150-2 is depicted as including input/output circuitry 152 for receiving audio signal A21 for many local audio generating device (e.g., the audio input device 136-2) and for providing at least one audio signal A2-OUT to an audio presentation device 134-2 (e.g., an audio speaker).

The second computer 150-2 also includes a network audio protocol (NAP) module 156 which is used to implement a substantially fixed or constant latency transport mechanism between the second computer 150-2 at the second location and the first computer 150-1 at the first location. The second computer 150-2 is configured to communicate audio signal A21 and/or other audio signals to the first location by the network 140 as an audio stream AS-21 in accordance with the NAP. The second computer 150-2 is configured to receive an audio stream AS-12 from the first location via the network 140 in accordance with the NAP.

It should be noted that each of the first and second computers 150-1, 150-2 may comprise a standard computing device such as a laptop computer, mobile telephone, tablet or any other computing device capable of performing the various functions described herein. These computers 150, while depicted in a simplified form, includes processing, memory, input/output and various other components as described herein in more detail as will be appreciated by those skilled in the art.

It should be noted that while FIG. 1 depicts two timing reference sources 110 generating to respective timing signals TS-1 and TS-2, it will be appreciated by those skilled in the art that the timing signals TS received by multiple GMs 120 may comprise the same (e.g., GPS-based timing signals) or different (e.g., respective mobile base station-derived timing signals) timing signals, depending upon location, configuration of GM and the like. Each of the multiple locations may receive a respective timing signal TS such as from a local LTE/4G mobile communications tower, from "visible" GPS satellites or from some other highly accurate and locally available source of timing signal/information.

The system 100 of FIG. 1 contemplates one or both of the sequencer controlled instrument 132-1 and audio playback device 133-1 at location 1 generating audio output with start, stop, tempo and offset parameters controlled via first GM 120-1, while a singer or musician performs using tempo information provided by second GM 120-2. In addition, some or all of the audio information may be presented at either or both of the audio presentation devices 134 at the two locations.

Figure 2:
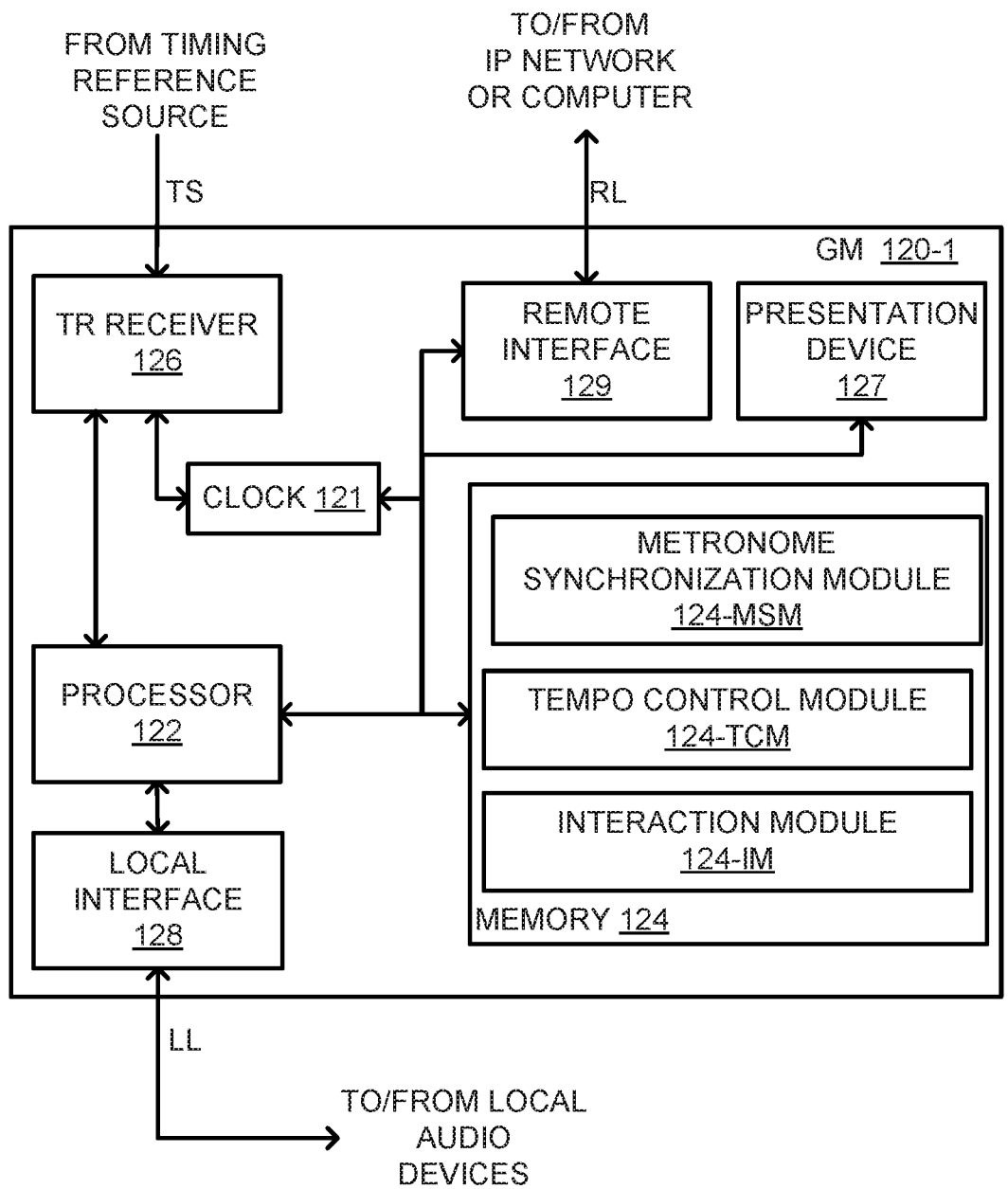
FIG. 2 depicts a high-level block diagram of an embodiment of a global metronome (GM) suitable for use in the system of FIG.

FIG. 2 depicts a high-level block diagram of an embodiment of a global metronome (GM) suitable for use in the system of FIG. 1. Specifically, FIG. 2 depicts a high-level block diagram of a GM 120 suitable for use in the system 100 described above with respect to FIG. 1.

The GM 120 of FIG. 2 comprises a local clock 121, one or more processor(s) 122, a memory 124, a timing reference receiver 126 and the local interface 128. Optionally, GM 120 includes a presentation device 127, illustratively an audio speaker, audio output signal connector, display device, display output signal connector and the like.

Optionally, GM 120 includes a remote interface 129, illustratively a network interface device or other device supporting communications between the GM 120 and the Internet, such as via the network 140. In various embodiments, the remote interface 129 is used to support communications to/from remote computing devices which are facilitated via the interaction module 124-IM, as described below (e.g., receiving commands associated with local audio or event related devices, transmitting commands associated with audio or event related devices at other locations, coordinating sessions with other computing devices/locations, coordinating execution of multimedia presentations and so on).

The processor(s) 122 is adapted to cooperate with the memory 124, the timing reference receiver 126 and the local interface 128 to perform the various timing synchronization, metronome and other functions as described herein with respect to the various embodiments.

The memory 124, generally speaking, stores programs, data, tools and the like that are adapted for use in providing various timing synchronization, metronome synchronization, tempo adaptation, local device control and other functions as described herein with respect to the various embodiments. The memory 124 is depicted as including instructions associated with a local metronome synchronization module 124-LMSM, a tempo adaptation module 124-TAM and an interaction module 124-IM. Instructions associated with various other modules (not shown) such as general operating system instructions and the like may also be stored in the memory 124.

The TR receiver 126 is adapted to receive high accuracy timing signals provided by a timing reference (e.g., GPS, mobile communications tower and the like) and process such timing signals to extract therefrom highly accurate timing information for use by the global metronome 120 and its various components, such as to synchronize clock 121 with the timing reference source. In this manner, all clocks 121 from all global metronomes 120 are synchronized to substantially the same highly accurate timing reference source.

The local interface 128 is adapted to communicate with one or more local devices such previously described with respect to the local link LL of the system 100 of FIG. 1.

Information communicated by the global metronome 120 to a local device 130 may comprise globally-accurate timing synchronization information and/or tempo synchronization information, such as tempo (e.g., speed information pertaining to a musical performance), position (e.g., playback position pertaining to musical performance), phase (e.g., per current playback note or measure, in relation to a beat or measure) and the like. In various other embodiments, other types of information may be used depending upon, illustratively, whether the events associated/invoked with a local device 130 comprise musical events or nonmusical events.

The metronome synchronization module 124-MSM is configured to perform various metronome synchronization functions, such as determining the phase of a master metronome, synchronizing local metronomes to the master metronome, offsetting a local metronome, providing metronome indicative signals/data and performing various other related functions. For example, MSM 124-MSM may be used to generate a local metronome signal comprising a sequence of "ticks" or beats that is phase synchronized with a virtual or master metronome. The local metronome signal may be used to create an audible noise via presentation device 127. The local metronome signal may be provided to local audio devices via the local interface 128 of the GM 120.

The tempo control module 124-TCM it is configured to perform various tempo control/synchronization functions, such as communicating tempo control information to local audio devices and/or event devices, adapting local device tempos in response to scheduled, requested or otherwise indicated tempo changes, and performing various other related functions.

The operation of the metronome synchronization module 124-MSM AND tempo adaptation module 124-TAM will be described more detail below with respect to FIG. 3.

The interaction module 124-IM is configured to perform various interaction functions such as generating a user interface suitable for use by a remote operator or computing entity wishing to interact with the GM 120 such as to change various settings or configure various operating parameters of local devices. Such interaction may be provided via a web-based interface, client-server interface, graphical user interface (GUI) and the like.

In various embodiments, the global metronome 120 and local computing device 150 at a "master" location operate as a time/tempo server with respect to the local computing, audio, event and other devices at one or more "slave" locations. The master location may include computing, audio input/output and other devices utilized by a singer, musician, conductor, event coordinator and the like, whereas the slave locations may comprise computing, audio input/output and other devices tasked with generating sequenced audio playback, events and the like in response to control messages and timing messages received from the master location. In these embodiments, interaction module 124-IM may be configured to perform the various communication/interaction functions supporting the various medications between the master and slave locations.

Generally speaking, timing information may be served to local devices via a local link LL in accordance with any suitable timing distribution/signaling mechanism or protocol, such as Network Time Protocol (NTP), Precision Time Protocol (PTP), LANdini protocol, Ableton Link and MIDI clock.

In various embodiments, the global metronome 120 and local computer device 150 at each location operate as an inherently synchronized Network Time Protocol (NTP) server (or other type of time/synchronization server) configured to provide highly accurate timing and synchronization information to local devices.

The GM 120, such as utilized in the system 100 depicted above with respect to FIG. 1, contemplates a twofold solution to tempo synchronization; namely, (1) a concept denoted herein as a Global Metronome, and (2) an absolute tempo synchronization mechanism. Specifically, all global metronome implementations are configured to beat in time with one another and to do so automatically without communication there between. This is possible because they use the same method for computing the time of the next beat, and because their clocks are synchronized.

Various embodiments synchronize system clocks using very high accuracy timing reference signals, such as provided via Global Positioning System (GPS) receivers, Long-Term Evolution (LTE) or 4G mobile synchronizing signals and the like. Synchronizing via GPS or LTE circumvents the error inherent in Internet-based time synchronization methods.

In various embodiments, the GM 120 provides a visual indication of the strength and accuracy of a GPS connection, LTE/4G connection and/or other timing reference signal connection via a liquid crystal display (LCD) or other display device.

In various embodiments, the GM on 20 accepts input signals and is responsive to such input signals to change tempo and/or phase parameters associated with the local metronome. Such signals may be provided via buttons or a touchscreen display.

In various embodiments, the GM 120 is responsive to messages received by the network 140 to change tempo and/or phase parameters of the local metronome. In various embodiments, such messages received via a user interface adapted to facilitate communications between the GM 120 and a remote server or other network entity.

While the GPS embodiments of the disclosed embodiments contemplate that the TR receiver 126 is located near a window, if the desired activity is inside a building or has no view of the sky for some reason, the device can be placed outside or near a window, and the sync signal can be transmitted via a dedicated network to the activity location. This approach is different than the network approach described above in that the global metronome is the master clock and the receiving devices synchronize to it. There is no time or tempo negotiation between the master and slave devices.

Clock/Time Synchronization

The GM 120 acquires a reference timing signal such as a GPS, LTE/4G or other signal containing highly accurate timing information. An absolute time value is determined using the acquired reference timing signal, and the local clock 121 is synchronized to the determined absolute time value. In this manner, a timestamp indicative of the absolute time value may be utilized by local devices to map musical and/or non-musical performances onto a timeline and synchronize such performances at a per-beat or per-sample level. This process of clock/time synchronization is continually repeated by the TR receiver 126, clock 121 and/or other components within the GM 120 such that clock 121 remains locked to the global clock associated with the timing reference source.

Tempo Synchronization/Control

Each GM 120 uses an agreed-upon method to compute a next "tick", or phase, of the metronome. It is useful to think of the relationship between a metronome and time as a rotating phasor with phase $0 \leq \varphi \leq 2\pi$. For a given tempo f (e.g., in beats per minute), the phasor makes f rotations every minute, and the metronome "tick" (if desired) is played when $\varphi(t)=0$. When two metronomes have $\varphi 1 = \varphi 2$ for all t they are synchronized with one another; with respective tempo phasors f1 and f2 rotating at the same rate and with the same phase. Given synchronized system clocks, the Global Metronome provides a standardized way to compute $\varphi$ while achieving tempo synchronization.

Figure 3:
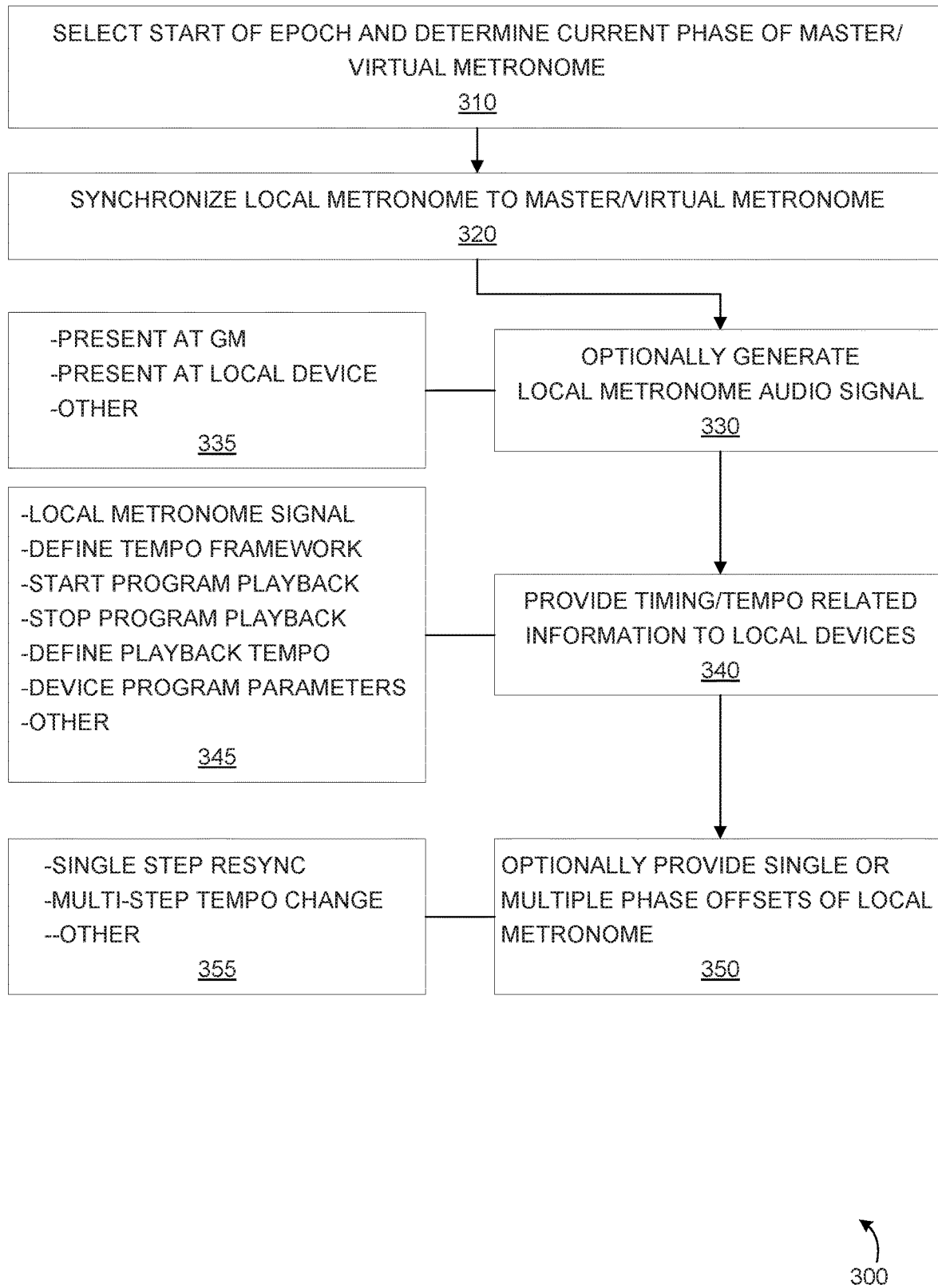
FIG. 3 depicts a flow diagram of a method according to various embodiments.

FIG. 3 depicts a flow diagram of a method suitable for use in the global metronomes of the system of FIG. 1. Specifically, FIG. 3 depicts a method 300 suitable for use in implementing various functions associated with the metronome synchronization module 124-MSM and tempo adaptation module 124-TAM described above with respect to FIG. 2.

Local Metronome Synchronization

At step 310, the start of an epoch is selected and the current phase of a master metronome based upon that epoch start is determined.

The same epoch starting time is selected for each global metronome 120, such as the beginning of the Unix epoch (Jan. 1, 1970), the beginning of this century, the beginning of this year or any other suitable start time. The selected epoch simply identifies a start time of a theoretical or "virtual" master metronome that has been ticking at a constant tempo since the beginning of the selected epoch.

The current phase of the master/virtual metronome is determined using an epoch-specific current time t and a metronome period T. For example, determining the current phase of the Global Metronome maybe performed by first dividing the epoch-specific time t in seconds (i.e., number of seconds t since beginning of the epoch) by the period of the metronome (e.g., one second, half second, 4/4 measure etc.) to yield a fractional result or remainder, which fractional result or remainder determines the current phase of the master metronome such as per equations 1 and 2 below, where f is the tempo in beats per minute, T is the period, and $\varphi_{global}$ is the phase of the Global Metronome.

$$T = \frac{60}{f} \qquad (Eq. 1)$$

$$\varphi_{global}(t, T) = 2\pi\left(\frac{t}{T} - \left\lfloor\frac{t}{T}\right\rfloor\right) \qquad (Eq. 2)$$

At step 320, the local metronome is synchronized to the master/virtual metronome. That is, at step 320 the phase of the local metronome is synchronized to the phase of the master/virtual metronome such that the two metronomes synchronized. By synchronizing the local metronome to the master metronome at each of a plurality of global metronomes 120, each global metronome 120 is synchronized to all the other global metronomes 120. Each local metronome provides a count or beat which is incremented in an effectively synchronized manner with that of a plurality of other local metronomes such that, upon reaching a predefined or agreed-upon number of counts or beats, an appropriate action may be triggered at one or more of the plurality of local metronome locations in a synchronized manner. Such an action may comprise, illustratively, starting or stopping a sequencer controlled instrument or other local device, starting or stopping a musical or non-musical event, changing a tempo or other parameter associated with a sequencer controlled instrument or other local device and so on.

At step 330, a local metronome audio signal is optionally generated for presentation by, as per box 335, the global metronome 120 itself (e.g., via a built-in presentation device 127), a local presentation device 134 or some other device.

At step 340, timing/tempo related information is provided to local devices (e.g., sequencer controlled instruments, audio recording devices, audio playback devices, audio input devices, audio output devices, event triggered/triggering machines and the like) via the local link LL. Referring to box 345, such information may comprise a local metronome signal and/or a defined tempo framework such as determined at steps 310-320 to enable thereby global synchronization among all such devices at all locations controlled by a global metronome 120. Such information may also comprise various device control messages such as a start program playback message, a stop program playback message, a defined playback tempo message, device program parameters (e.g., instrument selection, loudness, preprogrammed track or other parameters specific to a local device) and/or other message is relevant to the operation and synchronization of local audio and computing devices.

At step 350, one or more phase offsets are optionally provided to the local metronome, such as (per box 355) to provide a single step re-sink or offset of the local and master/virtual metronomes, or to provide a multi-step tempo change using multiple changes in offsets between the local and master/virtual metronomes (e.g., to provide a smooth transition between tempos). These offsets may be associated with a desired offset between the local and global metronome, preplanned changes in tempo, changes in tempo detected in a musical performance, changes in tempo due to other circumstances. By utilizing identical single or multi-step offsets at each of the global metronomes, the various audio and computing devices at each location are kept synchronized even during tempo changes and the like. Various embodiments to implement such single or multi-step offsets will now be discussed.

Phase Offset of Local Metronome

Specifically, at times it might be appropriate for the phase of a local metronome to be purposefully offset from the Global Metronome (e.g., after a tempo change). Therefore, this optional step allows a local device or client to specify a local phase offset term θ, where 0<θ<2π. The phase of a local device or client at time t, given a desired tempo f and local phase offset θ, can be precisely computed in terms of the Global Metronome, as per below equation 3, where T is the period as computed in Equation 1.

$$\varphi_{total}(t, T, \theta) = \left[2\pi\left(\frac{t}{T} - \left\lfloor\frac{t}{T}\right\rfloor\right) + \theta\right] \mod 2\pi \quad \text{(Eq. 3)}$$

A single phase offset is useful in various circumstances, such as when it is desired to begin playing audio immediately, without waiting to align the local metronome with the master metronome. In this case, when the audio begins playing it is almost certainly going to be out of phase with the master metronome. In this event, the current phase of the audio is transmitted to a collaborators such as at another location such that an offset may be calculated by the collaborator.

Multiple Phase Offsets of Local Metronome to Change Tempo

Multiple phase offsets are useful for smoothing a tempo change. For many types of music, tempo changes are an important part of performance. Since the various embodiments provide an absolute metronome with no latency errors between local client devices, the global metronome embodiments described herein remove latency-induced ambiguity during such tempo changes. As tempos change, a desired change in the current tempo for offset θ is optionally preplanned or communicated among local devices or clients. In this manner, as long as all metronomes used by performers have the same f and θ, the performers will be in sync with one another.

The various embodiments make tempo changes easier by guaranteeing that once a change is complete, all players are still synchronized with each other. All that is needed is that they use the same f and θ. However, changing from tempo $f_1$ to $f_2$ will cause a discontinuous jump in metronome phase because φ(t; T1; θ★)≠φ(t; T2; θ★) for nearly all f1≠f2.

In various embodiments, perceptually smooth tempo changes are implemented by (1) dividing the full tempo change into smaller quantized steps and (2) adjusting the phase offset θ to maintain smooth progress through the current beat.

When making tempo changes, it is desirable to do so while making sure the metronome phase progresses smoothly, without any jumps. Tempo changes using the Global Metronome are different than other tempo systems because of how epoch time is divided into phasor rotations, as previously discussed. When changing tempo, the number of completed phasor rotations changes, as does the current φ. The overwhelming majority of changes in tempo (no matter how small) will cause a discontinuous jump in φ. To maintain smooth progress through the current beat the various embodiments recompute θ for each new tempo passed through or utilized from the initial/existing tempo through to the ultimate/desired tempo.

To execute a perceptually smooth tempo change, tempo changes our quantized into a series of discrete tempo change "steps" that are large enough to have minimal impact on processor usage, but small enough so that the change is perceptually smooth. For example, to transition from 60 bpm to 72 bpm over 3 beats, the 12 bpm change in tempo is divided into 12 equal steps of 1 bpm tempo increases. Implemented in terms of metronome phase, this tempo change may be specified as happening over, illustratively, 3×2π radians, spending π/2 radians of the phasor in each intermediate tempo. A 1 bpm for each step value (i.e., a one bpm quantization amount) is recommended for tempos greater than 50 bpm since 1 bpm is below the 2% just noticeable difference level of human hearing. However, this quantization amount can be changed to other step values depending upon various factors such as how quickly the tempo change needs to be implemented, how much processing power is available to calculate and implement the changes in tempo, as well as other factors.

During a tempo change it is useful to consider that there are effectively two different "time" worlds; namely, epoch time and beat time. As tempo is accelerated, the same amount of beat time is expended in each tempo (e.g., in case above π/2 radians, or ¼ of a beat). If tempo increases, however, a decreasing amount of epoch time is spent in each successive tempo step, and if tempo decreases then an increasing amount of epoch time is spent in each successive tempo step.

When changing to a new tempo, phase offset is recomputed, as per equation 4 below, where t is the current epoch time, $T_{new}$ is the period of the new tempo, and $\varphi_{local}$ is the current metronome phase.

$$\theta_{new} = \left[\varphi_{local} - 2\pi\left(\frac{t}{T_{new}} - \left\lfloor\frac{t}{T_{new}}\right\rfloor\right)\right] \mod 2\pi \quad \text{(Eq. 4)}$$

If $\theta_{new}$ is used in the formula metro(t; f; $\theta_{new}$), there will be no phase discontinuity between the two tempos. Note that this method is just one example of how to make a tempo change. In other embodiments, different tempo change methods are used. For example, some embodiments apply a curve to the rate change, or spend equal epoch time in each intermediate tempo. In any event, it is desirable to (1) recompute θ with every tempo change and (2) quantize tempo changes into steps that are large enough to be easy on the processor, but small enough to be perceptually smooth (e.g., 1 bpm steps if possible).

The various embodiments enable musicians to play together over long distances, in particular for playing collaborative music over the Internet. Specifically, musicians at different locations may play, practice, jam and otherwise collaborate with each other by using the global metronome as a clock to which all of the musicians are synchronized.

The various embodiments enable users to synchronize the speed/tempo of an audio playback/presentation such that it may be synchronized sample-for-sample (i.e., "sample accurate") with another playback/presentation that is controlled by other global metronome devices. Examples of audio might be a metronome tick, drum beat, backing tracks, spoken word, or any other audio source material.

The various embodiments provide an absolute reference for tempos that May otherwise tend to wander. These embodiments may be used to keep track of how far away from the absolute "global tempo" a beat is, allowing for a precise description of the phase and tempo of that beat at any given time. This information may be transmitted to any other global metronome such that the beat may be accurately re-created in terms of phase and tempo anywhere.

The various embodiments may act as a random seed random seed for stochastic processes (based on time) to enable the same tempo-based processes two perform pseudo-random, synchronized operations.

The various embodiments enable the synchronization of local devices and clients from different locations (or even the same location) without requiring the use of timing/synchronization bearing cabling.

Various embodiments of the GM 120 discussed in FIG. 1 may be implemented by, for example, inexpensive special purpose hardware such as the Raspberry Pi device manufactured by or under the guidance of the UK-based Raspberry Pi Foundation. The special purpose hardware may include a GPS antenna board including an active GPS antenna, USB Wi-Fi board and the like such that the functions described above with respect to the GM 120 may be fully implemented.

As previous noted, the various embodiments enable synchronization of devices without direct communication between the devices. Such synchronization finds particular utility within the context of collaborative music, light shows and other performance related events, movie playback for multiple distant viewers, recording studios in different locations (i.e., play music in a local studio and recording the music at a remote studio) and so on. Generally speaking, the various embodiments provide an excellent mechanism for synchronization of media events over a desired timeline.

Various embodiments may be used to provide a mechanism by which events of the concert venue may be synchronized without laying down cable between all the devices that the venue.

Various embodiments may be used to provide a mechanism by which an amusement park may synchronize activities of objects at a very high level (e.g., near and far sound generating devices producing sound that is received by a listener at the same time.

Various embodiments may be adapted to assist with speaker alignment within a home.

Within the context of musical applications, it is noted that a musical piece is divided up in to a number of notes and beats. Tempo information comprises location, speed and phase information. Start message and tempo messages (e.g., 24 pulses per quarter note) may be used to configure a device with a start time and with a tempo to be used by the device. Thus, the various embodiments provide a method to compute tempo (speed), Position (absolute position in a playback piece of music) and Phase (per current note, per current measure, in relation to beat etc.) to provide thereby a mechanism defining absolute time, starting beat, stopping beat and tempo. In this manner, sample accurate synchronization of audio clocks for multiple audio playback devices may be achieved.

It will be appreciated that the functions depicted and described herein may be implemented in hardware or in a combination of software and hardware, e.g., using a general purpose computer, one or more application specific integrated circuits (ASIC), or any other hardware equivalents. It will be appreciated that GM 120, various embodiments of local devices 130, as well as other devices described herein are generally depicted as general purpose computing devices having a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

While specific systems, apparatus, methodologies, mechanisms and the like have been disclosed as discussed above, it should be apparent to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. In addition, the references listed herein are also part of the application and are incorporated by reference in their entirety as if fully set forth herein.

What is claimed is:

1. Apparatus, comprising:
a timing reference receiver, for receiving a high accuracy timing signal configured to synchronize a local clock;
a metronome synchronizer, cooperating with the local clock, for synchronizing a phase of a local metronome to a phase of a virtual metronome to provide thereby a sequence of phase synchronized metronome output beats, said virtual metronome phase determined using an epoch-specific time t and a metronome period T; and
a local interface, to communicate start, stop and tempo messages toward one or more local audio devices in accordance with said phase synchronized metronome output beats;
wherein said metronome synchronizer is configured to offset a phase of said local metronome with respect to said virtual metronome;
wherein said local phase offset comprises a term θ between zero and 2π, and wherein a phase of a local device at a time t, tempo f and local phase offset θ computed in terms of the following equation, where T is the virtual metronome period:

$$\varphi_{local}(t, T, \theta) = \left[2\pi\left(\frac{t}{T} - \left\lfloor\frac{t}{T}\right\rfloor\right) + \theta\right] \bmod 2\pi.$$

2. The apparatus of claim 1, further comprising:
a local computing device, coupled to said one or more local audio devices for receiving audio data therefrom, and configured to transmit said audio data to a remote computing device using a network audio protocol (NAP).

3. The apparatus of claim 2, wherein said local computing device is further configured receive audio data from a remote computing device using said NAP, said apparatus further comprising:
a local audio presentation device, coupled to said local computing device, for presenting audio data provided by said local computing device, said audio data comprising at least one of audio data received from said NAP and audio data received from said one or more local audio devices.

4. The apparatus of claim 3, wherein said local computing device is further configured to impart a selected amount of delay to the presentation of audio data received from said one or more local audio devices.

5. The apparatus of claim 4, wherein said delay imparted to the presentation of audio data received from said one or more local audio devices being selected as substantially equivalent to a substantially fixed latency delay imparted to audio data received from said remote computing device by said NAP.

6. The apparatus of claim 2, wherein said metronome synchronizer is configured to offset said phase of said local metronome with respect to said virtual metronome in response to a control signal received by said local computing device.

7. The apparatus of claim 1, wherein said local phase offset comprises a multi-step sequence of phase offsets configured to change a tempo from an existing tempo to a new tempo, each phase offset selected to change resulting tempo by a predefined number of beats per second.

8. The apparatus of claim 7, wherein said predefined number of beats per second comprises approximately one per second.

9. The apparatus of claim 7, wherein each of said multi-step sequence of phase offsets as computed in accordance with the following equation, where t is the epoch time, Tnew is the period of the new tempo, and φlocal is the current metronome phase:

$$\theta_{new} = \left[\varphi_{local} - 2\pi\left(\frac{t}{T_{new}} - \left\lfloor\frac{t}{T_{new}}\right\rfloor\right)\right] \bmod 2\pi.$$

10. The apparatus of claim 1, further comprising an interaction module configured to receive timing and synchronization messages from a remote computing device.

11. The apparatus of claim 1, further comprising an interaction module configured to transmit timing and synchronization messages toward local devices in accordance with a Network Time Protocol (NTP).

12. The apparatus of claim 1, wherein said high accuracy timing signal comprises any of a Global Positioning System (GPS) timing signal and a Long Term Evolution (LTE) timing signal.

13. The apparatus of claim 1, further comprising an interaction module configured to transmit timing and synchronization messages toward local devices in accordance with at least one of a Network Time Protocol (NTP), Precision Time Protocol (PTP), LANdini protocol, Ableton Link and MIDI clock.

14. A method of synchronizing local metronomes at each of a plurality of locations, the method performed by a respective electronic device at each of the plurality of locations, the method comprising:
receiving a high accuracy timing signal and using the high accuracy timing signal to update a local clock;
determining a phase of a virtual metronome using the updated local clock, a predetermined epoch-specific time t and a metronome period T;
synchronizing a phase of a local metronome to the determined phase of the virtual metronome;
generating control messages associated with local devices in accordance with the local metronome; and
offsetting a phase of said local metronome with respect to said virtual metronome in response to a phase offset control signal;
wherein a local phase offset is defined a term θ between zero and 2π, and wherein a phase of a local device at a time t, tempo f and local phase offset θ computed in terms of the following equation, where T is the virtual metronome period:

$$\varphi_{local}(t, T, \theta) = \left[2\pi\left(\frac{t}{T} - \left\lfloor\frac{t}{T}\right\rfloor\right) + \theta\right] \bmod 2\pi.$$

15. The method of claim 14, wherein said high accuracy timing signal comprises any of a Global Positioning System (GPS) timing signal and a Long Term Evolution (LTE) timing signal.

16. The method of claim 14, wherein said control messages associated with local devices comprise start, stop and tempo messages associated with one or more of an audio playback device and a sequencer controlled device.

17. The method of claim 14, wherein said local metronome phase is offset via a multi-step sequence of phase offsets configured to change a tempo from an initial tempo to a final tempo, each phase offset selected to change resulting tempo by a predefined number of beats per second.

18. A system comprising an apparatus at a first location communicating with an apparatus at a second location via a network audio protocol (NAP), wherein:
each apparatus comprising:
a local clock;
a timing reference receiver, for receiving a high accuracy timing signal and synchronizing the local clock in accordance with the received high accuracy timing signal; and
a metronome synchronizer, for synchronizing a phase of a local metronome to a calculated phase of a virtual metronome;
wherein said metronome synchronizer is configured to offset a phase of said local metronome with respect to said virtual metronome;
wherein said local phase offset comprises a term θ between zero and 2π, and wherein a phase of a local device at a time t, tempo f and local phase offset θ computed in terms of the following equation, where T is the virtual metronome period:

$$\varphi_{local}(t, T, \theta) = \left[2\pi\left(\frac{t}{T} - \left\lfloor\frac{t}{T}\right\rfloor\right) + \theta\right] \bmod 2\pi,$$

said apparatus at said first location further comprising:
a tempo controller, for generating tempo control information configured to cause a local device to start playing an audio program at a defined tempo; and
a computing device, for transmitting an audio stream including said audio program via said NAP;
said apparatus at said second location further comprising:
an audio input device, for receiving a live performance audio signal;
a computing device, for receiving said audio stream including said audio program via said NAP; and
an audio presentation device for presenting said audio program and said life performance.

19. The system of claim 18, wherein said local computing device of said apparatus at said second location is further configured to impart a selected amount of delay to the presentation of audio signal received from said audio input device.

20. The system of claim 19, wherein said delay imparted to the presentation of audio signal received from said audio input device being selected as substantially equivalent to a substantially fixed latency delay imparted to audio data received from a remote computing device by said NAP.

* * * * *